May 20, 1958 V. BUCHHOLZ 2,835,399
BOAT TRAILERS

Filed June 14, 1955 2 Sheets-Sheet 1

INVENTOR.
Vincent Buchholz
BY
Attorney

May 20, 1958 V. BUCHHOLZ 2,835,399
BOAT TRAILERS
Filed June 14, 1955 2 Sheets-Sheet 2

INVENTOR.
Vincent Buchholz
BY
Attorney

United States Patent Office 2,835,399
Patented May 20, 1958

2,835,399
BOAT TRAILERS

Vincent Buchholz, Roggen, Colo.

Application June 14, 1955, Serial No. 515,419

1 Claim. (Cl. 214—506)

This invention relates to a trailer for transporting a boat at the rear of an automobile or other vehicle and has for its principal object the provision of a sturdy, lightweight trailer which can be backed beneath a boat in a lake or other body of water and hydraulically operated to lift the boat from the water upon a wheeled chassis for immediate transportation.

Another object of the invention is to provide a mechanism for raising and lowering the trailer chassis in which all of the usual cables, winches and claims will be eliminated and to provide a mechanism which can be quickly and easily operated from a simple hand driven hydraulic pump.

A further object is to provide such a trailer with individually sprung wheels so that the boat and the chassis will be relieved of vibration and other stresses when traveling over uneven ground.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
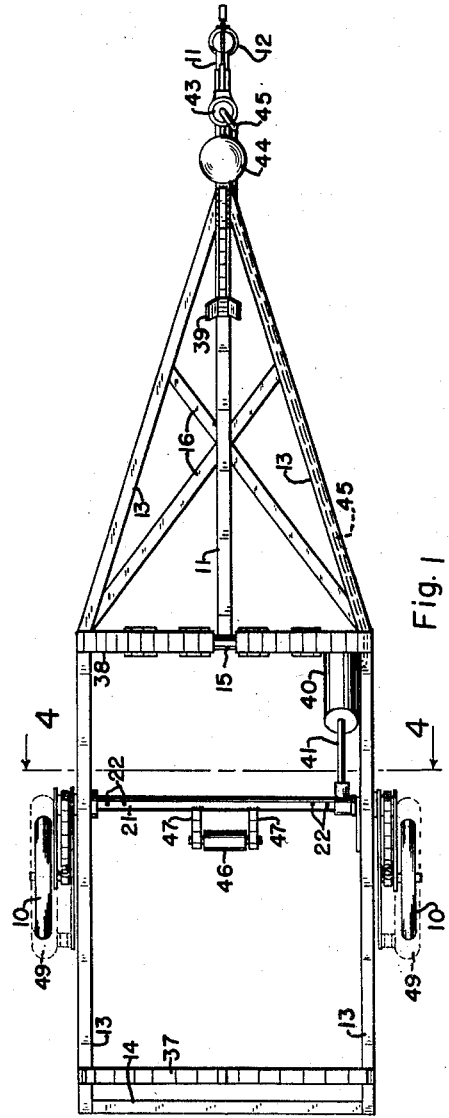
Fig. 1 is a plan view of the improved boat trailer.

The improved trailer consists in the main of a flat chassis frame supported upon two suitable ground-engaging wheels 10 and provided with a towing tongue 11 having any conventional trailer hitch device 12 by means of which the frame can be attached to and detached from a towing vehicle.

The chassis frame comprises two side frame members 13 which flare outwardly and rearwardly at each side of the tongue 11, thence extend rearwardly in parallel, spaced-apart relation to a rear end sill 14. A cross frame member 15 extends between the side frame members 13 substantially mid-way of their lengths and the rear extremity of the tongue 11 is welded or otherwise secured thereto. The chassis frame is preferably braced against angular distortion by means of suitable diagonal bracing 16. The chassis frame is provided with a constructional stern support 37 for supporting the stern of the boat, beam chocks 38 for supporting the mid-portion of the boat, and with a prow brace 39 for engaging the prow of the boat.

Each of the wheels 10 is mounted on an axle stub 17 which is welded to, or formed on, the rear extremity of a wheel arm 18 and extends horizontally outward from the latter. The forward extremities of the wheel arms are rotatably mounted on stub shafts 19, which are in turn rotatably mounted in pillow blocks 20 secured beneath the side frame members 13. The stub shafts 19, at the opposite sides of the chassis frame, are fixedly secured together in axial alignment by means of a tubular shaft 21. The stub shafts 19 extend within the extremities of the tubular shaft 21 and are secured therein by means of suitable rivets 22 or in any other desired manner. The shaft formed by the elements 19—21—19 could be a single shaft either tubular or solid. It greatly simplifies assembly, however, to have the shaft in three axially aligned parts.

An actuating lever 23 is fixed to and extends upwardly from one of the stub shafts 19. The lever 23 may be secured to its shaft 19 in any desired manner. As illustrated, it is formed on a shaft collar 24 which is secured against rotation on the shaft by means of a suitable set screw 25. The actuating lever 23 can be locked in the substantially vertical position by means of a locking brace 26 which is hingedly mounted at its lower extremity on the adjacent side frame member 13 and provided with an opening adjacent its upper extremity which can be slipped over a locking pin 27 projecting from the actuating lever 23.

A relatively long spring arm 28 is welded or otherwise secured to each stub shaft 19 externally adjacent each of the pillow blocks 20 and a relatively short spring arm 29 is similarly secured to each stub shaft 19 in parallel, aligned, spaced-apart relation to the long arm 28. Each of the wheel arms 18 is rotatably mounted on its stub shaft 19, between the arms 28 and 29 thereon, by means of an elongated bearing cap 30 and attachment nuts 31. The spring arms 28 and 29 at the two sides of the chassis frame are fixedly positioned in radial alignment.

A spring seat pad 32 is secured on each wheel arm 18 by means of an attachment screw 33 and a spring cap member 34 is tiltably mounted between each pair of spring arms 28—29 upon pivot studs 35 extending through the arms. A spiral compression spring 36 is mounted between each spring seat pad 32 and the adjacent spring cap member 34 at each side of the chassis frame.

A hydraulic cylinder 40 is hingedly mounted at its forward extremity upon a suitable supporting bracket 51 secured on the cross frame member 15. A hydraulically actuated plunger 41 projects from the cylinder 40 and terminates in a hinge pin 42 in the extremity of the actuating lever 23. Hydraulic fluid under pressure is supplied to the hydraulic cylinder 40 by means of a conventional hand pump 43 from a reservoir 44 through a fluid conduit 45.

Figure 2:
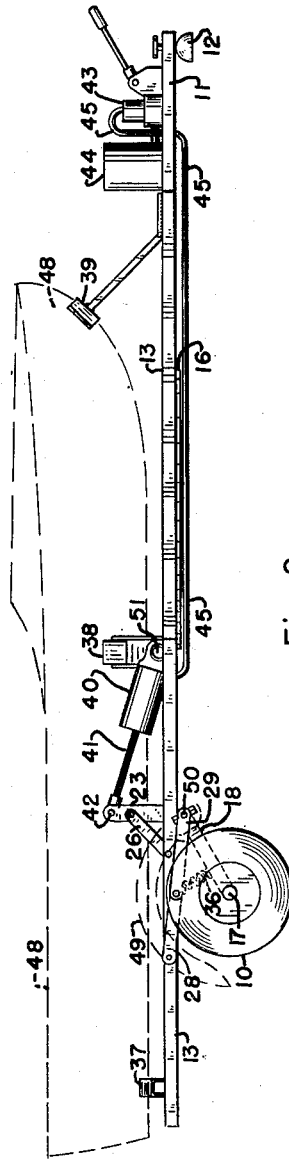
Fig. 2 is a side view thereof.

When the boat is in position for transportation, as indicated in broken line at 48 in Fig. 2, the shaft 19—21—19 is locked against rotation by the locking brace 26 and the major portion of the weight of the boat is transmitted through the spring arms 28 and 29 to the compression springs 36 and from thence through the wheel arms 18 to the wheel 10. Since each wheel is provided with an independent spring, tilting of the chassis frame upon uneven ground is greatly reduced.

Now let us assume it is desired to place the boat in a lake. The tow vehicle is reversed to back the improved trailer into the water for substantially its full length. The pump 43 is actuated to cause the hydraulic cylinder 40 and its plunger 41 to take up the load on the lever 23 so that the locking brace 26 may be released from its locking pin 27. The conventional pump valve is now released to allow the hydraulic fluid to return from the hydraulic cylinder to the reservoir 44.

Figure 3:
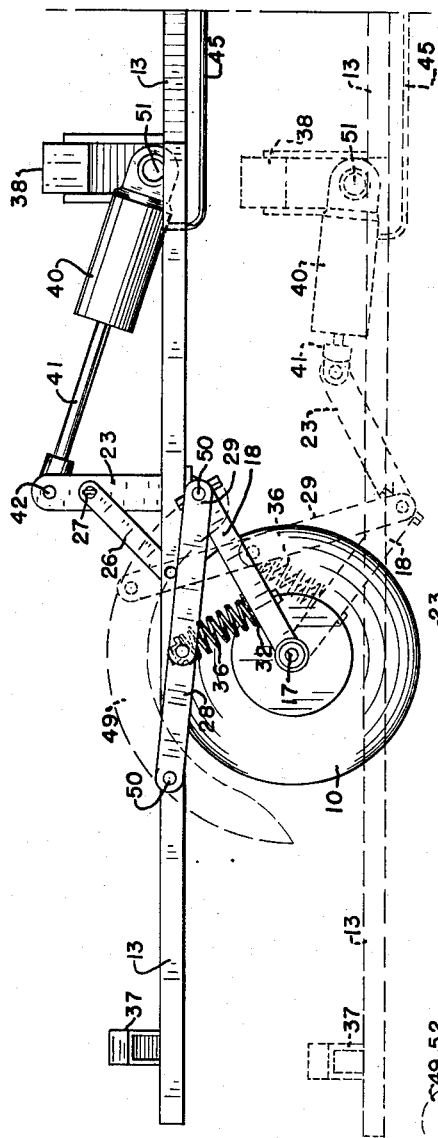
Fig. 3 is an enlarged fragmentary side view of the rear portion of the trailer with a rear wheel removed.
Figure 4:
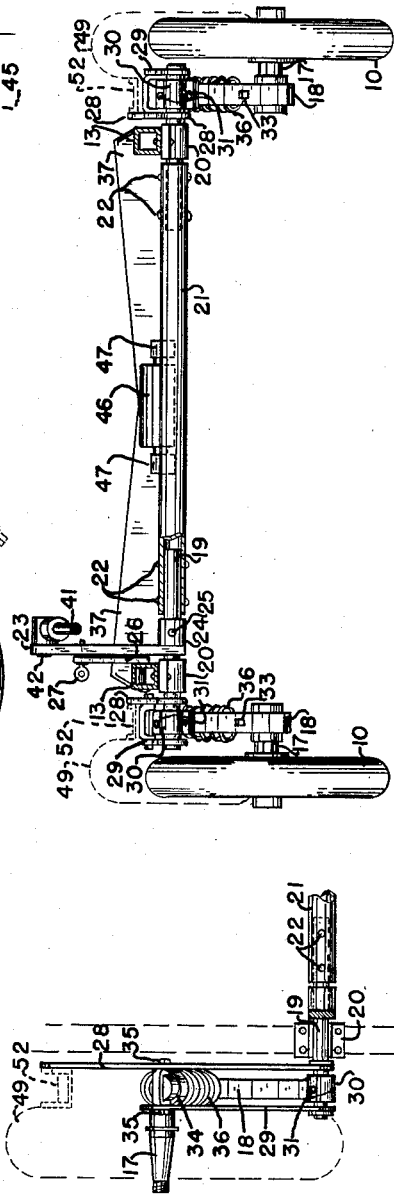
Fig. 4 is a cross section through the trailer, taken on the line 4—4, Fig. 1.
Figure 5:
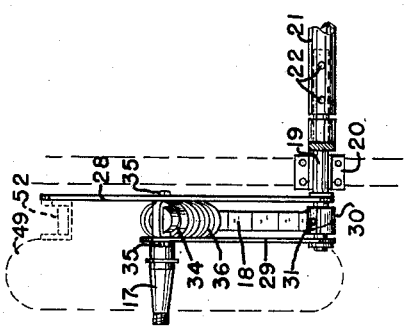
Fig. 5 is a still further enlarged fragmentary plan view of a wheel mounting mechanism employed on the improved trailer.

The weight on the chassis frame forces the shaft 19—21—19 downwardly causing the plunger 41 to be forced into the cylinder 40 as the entire chassis frame and the boat descends into the water, as indicated in broken line in Fig. 3. The boat can now be floated from the frame.

The boat is picked up from the water by simply reversing the above process, that is, the boat is floated over the chassis frame and the pump 43 is actuated to force the plunger 41 from the cylinder 40 so as to cause the entire structure to elevate to the solid line position of Fig. 3, and the traveling position of Fig. 2.

A keel roller 46 is provided to assist in rolling the boat onto and from the chassis frame. The keel roller is supported between bracket arms 47 projecting from the tubular shaft 21 at the middle of the latter. The radial position of the bracket arms 47 is such that when the boat 48 is in the elevated position (solid lines in Fig. 3) the roller 46 will be positioned to the rear of the shaft 21 and below, but out of contact with, the keel of the boat. When the shaft 21 is rotated to the broken line position of Fig. 3 the rotation of the shaft 21 will swing the bracket arms 47 upwardly and forwardly to cause the roller 46 to roll beneath the keel of the boat to elevate the latter from the stern support 37 and beam chocks 38 so that it may be readily rolled from the trailer chassis frame.

It is preferred to provide mud guards or fenders for the wheels 10. These have been omitted from the drawing to more clearly illustrate the wheel supporting structure. However, the position of the fenders is indicated in broken line at 49. The fenders are supported upon suitable brackets 52 mounted on the opposite extremities of each of the long spring arms 28, suitable holes 50 being provided in the arms for attaching the bracket.

While a specific form of the improvement has been described and illustrated herein, it is desired to be understood that the same may be varied, within the scope of the appended claims without departing from the spirit of the invention.

Having thus described the invention, what is claimed and desired secured by Letters Patent is:

A wheel mounting means for boat trailers including a boat supporting frame having opposite side members; comprising a rotatable shaft extending transversely of said frame beneath same, a wheel supporting arm at each end of said shaft, corresponding ends of said arms being rotatably mounted on said shaft, a stub axle fixed to the oposite end of each of said supporting arms, a ground engaging wheel rotatably mounted on each stub axle, a relatively long arm and a laterally opposed relatively short arm disposed adjacent each end of said shaft and having corresponding ends thereof secured to said shaft and between which arms said wheel supporting arms are disposed, a spring seat pad secured to each of said wheel supporting arms intermediate the ends thereof, a spring cap member tiltably mounted on and between the relatively long arm and the relatively short arm of each pair thereof and which cap member is disposed at the outer end of the relatively short arm and intermediate the ends of the relatively long arm, a spiral compression spring disposed between each seat pad and its corresponding cap member, an actuating lever having one end thereof secured to said shaft, releasable means for holding said actuating lever in normal vertical position, a hydraulic cylinder supported on said frame and pivotally secured thereto, and a plunger projecting from said cylinder and having its free end pivotally connected to said actuating lever.

References Cited in the file of this patent

UNITED STATES PATENTS

| | | |
|---|---|---|
| 2,453,388 | Schramm | Nov. 9, 1948 |
| 2,487,701 | Getz | Nov. 8, 1949 |
| 2,558,418 | Brueckman | June 26, 1951 |
| 2,586,485 | Schroeder | Feb. 19, 1952 |
| 2,610,865 | Cantrell | Sept. 16, 1952 |
| 2,636,745 | Cartwright | Apr. 28, 1953 |
| 2,733,823 | Evans | Feb. 7, 1956 |
| 2,788,908 | Lynd | Apr. 16, 1957 |